Figure 1:
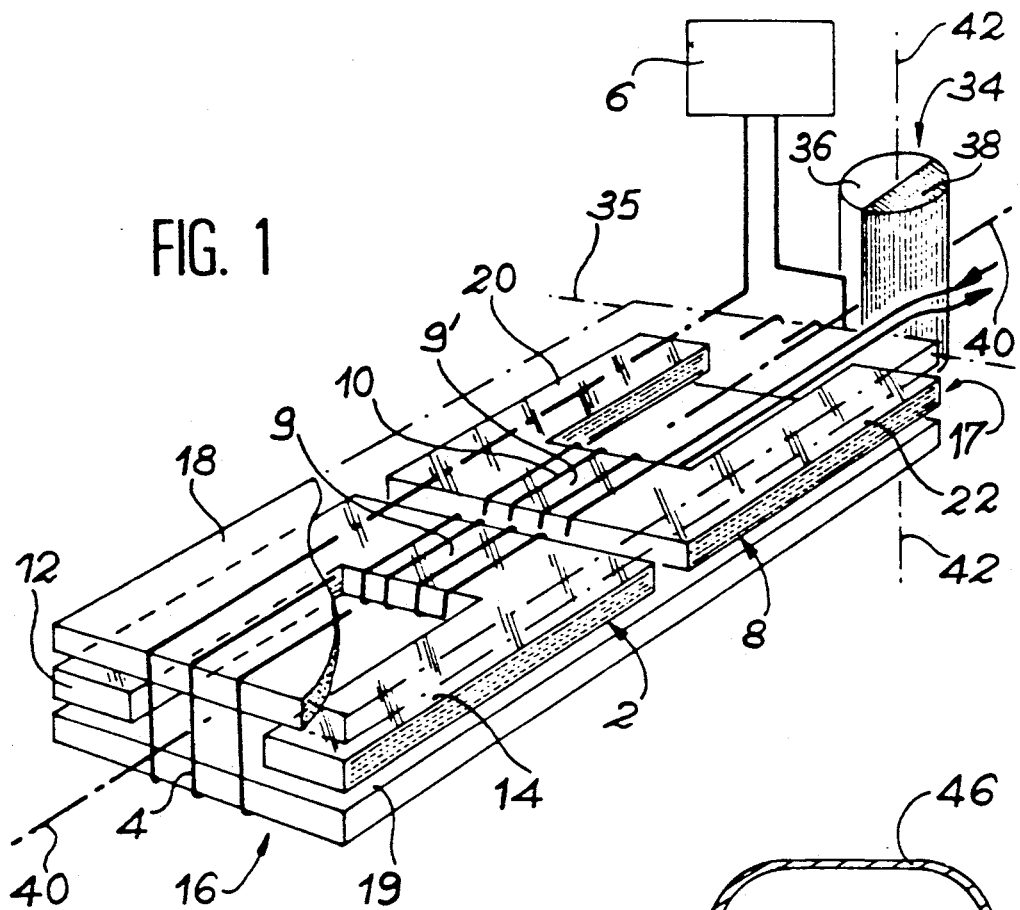

United States Patent [19]

Clergeot et al.

[11] Patent Number: 5,117,181
[45] Date of Patent: May 26, 1992

[54] INDUCTIVE TRANSDUCER WITH CALIBRATING BALANCING CORE FOR MEASURING MOVEMENT OF AN OBJECT

[75] Inventors: Henri Clergeot, Massy; Dominique Placko, Creteil; Michel Plantevin, Aix en Provence, all of France

[73] Assignee: Commissariat A l'Energie Atomique, Paris, France

[21] Appl. No.: 626,632

[22] Filed: Dec. 12, 1990

[30] Foreign Application Priority Data

Dec. 14, 1989 [FR] France .................. 89 16556

[51] Int. Cl.⁵ .................. G01B 7/14; G01P 3/42; G01R 35/00; G21C 17/00
[52] U.S. Cl. .................. 324/207.18; 324/173; 324/202; 324/207.12; 324/207.23; 376/258
[58] Field of Search .......... 324/173, 174, 202, 207.12, 324/207.17, 207.18, 207.19, 207.23, 207.25, 241; 376/258

[56] References Cited

U.S. PATENT DOCUMENTS

| | | | |
|---|---|---|---|
| 3,246,219 | 4/1966 | Devol et al. | 324/207.16 X |
| 3,290,487 | 12/1966 | Scott | 324/207.18 X |
| 3,617,874 | 11/1971 | Forster | 324/241 |
| 3,863,235 | 1/1975 | McKee et al. | |
| 4,430,615 | 2/1984 | Calvert | 324/239 |
| 4,786,869 | 11/1988 | Kanai et al. | 324/207.18 |
| 4,810,964 | 3/1989 | Granberg et al. | 324/207.18 |

FOREIGN PATENT DOCUMENTS

| | | |
|---|---|---|
| 2425648 | 12/1979 | France |
| 647316 | 1/1985 | Switzerland |
| 1236071 | 6/1971 | United Kingdom |
| 2132362 | 7/1984 | United Kingdom |

*Primary Examiner*—Gerard R. Strecker
*Attorney, Agent, or Firm*—Pearne, Gordon, McCoy & Granger

[57] ABSTRACT

The invention makes it possible to detect and measure the movement of a moving member (50) through an amagnetic or low permeability metal wall. The installation requires ferromagnetic material targets placed at regular intervals over the moving member. The transducer is positioned facing the moving member by its detection face (16). It comprises two ferromagnetic cores (2, 8) surrounded both by an exciting coil (4) and a measuring coil (10), at whose terminals the measuring signal is taken. The latter is proportional to the variable reluctance of the magnetic circuit, which varies as a function of the position of the ferromagnetic targets (48). The transducer is completed by a balancing core (34). Application to the measurement of the displacement of control rods in the vessel of a pressurized water reactor.

9 Claims, 4 Drawing Sheets

INDUCTIVE TRANSDUCER WITH CALIBRATING BALANCING CORE FOR MEASURING MOVEMENT OF AN OBJECT

DESCRIPTION

The field of the invention is that of measuring the displacement, translation or rotation of a moving member, particularly when the latter is not directly accessible. The invention is more particularly intended for application to the measurement of the displacement of a moving member located within an amagnetic or low permeability metal enclosure containing a pressurized fluid at high temperature. This is in particular the case for the detection of the position of control rods in a pressurized water reactor vessel.

Different types of measuring devices have already been used for checking and measuring, through the wall of a tight enclosure, the displacement of a member moving within said enclosure. Use is inter alia made of devices utilizing electromagnetic or magnetic phenomena.

French patent 2 425 648 describes a device of this type and in particular a magnetic field detector. The latter has a toroidal magnetic circuit comprising a ferromagnetic core placed on an amagnetic material support and a conductive winding around said core. The winding is supplied by a periodic current, so that in the absence of the field to be detected the core is not saturated. The potential drop created by this field at the terminals of said winding is measured. When this device is subject to the action of an external magnetic field, radial with respect to the magnetic circuit and of higher intensity than that of the coercive field of the latter, the flux variation through the winding is zero. Therefore the potential difference at the terminals of the winding is reduced to the ohmic drop in the latter.

However, this type of detector requires the installation of permanent magnets on the moving member. These permanent magnets must be very carefully fitted, because they must all be oriented in the same direction, as a function of the position of their north and south poles. If this is not done, said permanent magnets can lose their magnetization, which requires disadvantageous interventions. The object of the invention is to obviate such a disadvantage and to propose a transducer able to measure through a low permeability or amagnetic metal wall, the displacement of a moving member only having ferromagnetic targets.

To this end, a first main object of the invention is an inductive transducer operating by the detection of the variation of an electromagnetic quantity through a magnetic circuit and which comprises two U-shaped ferromagnetic cores, positioned back to back in the same plane and having a front face directed towards the targets to be detected and a rear face, and respectively receiving an exciting coil making it possible to create the magnetic field in the two ferromagnetic cores and a measuring coil, positioned in opposition, which makes it possible to measure the reluctance of the magnetic circuit, whilst still overcoming the interfering effects of influencing quantities, such as the surrounding magnetic field or the temperature, the exciting field having M turns and is supplied by a sinusoidal current of amplitude I and frequency F, which creates an alternating magnetic field, whose flux F is such that: $M \cdot I = F \cdot R =$ constant, in which R is the total reluctance of the magnetic circuit; two supporting and shielding plates made from an amagnetic material, which is a good conductor of electricity and which are enveloped by an electrical insulator, said two plates being positioned respectively on either side of the two ferromagnetic cores making it possible to keep the latter in place and concentrate the field lines towards the ferromagnetic target; and a balancing core constituted by two half-cylinders, one being made from an amagnetic material and the other from a ferromagnetic material, said balancing core being positioned close to the rear face of the transducer.

In a first case, the axis of revolution of said balancing core is parallel to the axis of the poles of the ferromagnetic cores. In another case, the axis of revolution of said balancing core is perpendicular to the axis of the poles of the ferromagnetic cores.

The rotation of the balancing core around its axis of revolution modifies the reluctance of the magnetic circuit of the rear face of the transducer, which makes it possible to adjust the reproducibility of the performance characteristics between individual transducers.

The elementary transducer, as defined hereinbefore, is preferably placed in an amagnetic material protective case. Such a transducer has relatively small overall dimensions and requires no permanent magnets on the moving member. It only requires simple ferromagnetic material targets, which can optionally be teeth cut from the material. Under these conditions, the only possible interventions which may be necessary are limited to the transducers. According to the invention, the inductive transducer is placed, by its front detection face, facing the moving member, to which are fixed the ferromagnetic material targets and from which it is generally separated by a low permeability or amagnetic metal wall.

Obviously, such a transducer makes it possible to accurately follow the displacement of a moving member having ferromagnetic targets, but whose separating wall is not metallic, or even if there is no separating wall.

During each passage of a ferromagnetic target in front of the transducer, the latter supplies a characteristic signal making it possible to measure the speed or displacement of the moving member carrying a plurality of targets.

Therefore the present invention also relates to a device for measuring the displacement speed of a moving member carrying a plurality of regularly spaced ferromagnetic targets. This device is characterized in that it comprises an elementary inductive transducer having two ferromagnetic cores placed by its detection face facing the moving member and whose exciting coil is connected to an alternating current source frequency controlled by an oscillator; a signal measuring line having a differential amplifier; a band-pass filter, whose output signals are multiplied by a reference signal with the aid of a multiplier, phase-displaced by an optimum angle φ with respect to the exciting current of the transducer with the aid of a phase shifter; a band-pass filter; a signal shaping circuit and means for counting and displaying the thus obtained signals.

In a second version, the transducer according to the invention comprises two measuring stages in each case constituted by two U-shaped ferromagnetic cores arranged back-to-back in the same plane and a measuring coil positioned in opposition, said two measuring stages being separated from one another and externally held in place by three supporting and shielding plates and having a single exciting coil arranged around the two external plates and a single balancing core positioned close to the rear face.

Such a two-stage transducer can be used for carrying out a measurement of the displacement of a moving member carrying targets.

Therefore the present invention also relates to a device for measuring the displacement of a moving member by counting the ferromagnetic targets passing in front of the transducer. This device is characterized in that it comprises a two-stage inductive transducer positioned by its detection face facing the moving member and whose exciting coil is connected to an alternating current source frequency controlled by an oscillator; two signal measuring lines respectively incorporating a differential amplifier; a band-pass filter, whose output signals are multiplied by a reference signal with the aid of a multiplier phase-shifted by an optimum angle $\phi$ with respect to the exciting current of the transducer with the aid of a phase shifter thus carrying out a synchronous detection; a low-pass filter and a signal shaping circuit, the phase displacement of the signals between the two measuring lines being recorded by a logic circuit for counting and determining the displacement or rotation direction of the moving member and optionally displayed on display means.

This same two-stage inductive transducer can also be used for carrying out an analog displacement measurement of a moving member.

Therefore the present invention also relates to an analog measuring device of the displacement of a moving member carrying a ferromagnetic target. This device is characterized in that it comprises a two-stage inductive transducer positioned by its detection face facing the moving member and whose exciting coil is connected to an alternating current source frequency controlled by an oscillator; two signal measuring lines respectively incorporating a differential amplifier; a band-pass filter, whose output signals are multiplied by a reference signal with the aid of a multiplier phase-shifted by an optimum angle $\phi$ with respect to the exciting current of the transducer with the aid of a phase shifter thus bringing about a synchronous detection; and a low-pass filter, whose output signals of the two measuring lines are subtracted from one another by a common subtraction circuit.

Preferably, the subtraction circuit is completed by a linearization circuit, which supplies a signal proportional to the displacement of the target.

In a variant, the analog displacement measuring device also has means for the addition of the output signals of the low-pass filters and a logic circuit for indicating the position and for the detection of the displacement direction of the moving member, whose information can be displayed on a display.

Such a device makes it possible to measure small displacements of the moving member with great accuracy, such as e.g. a contact-free moving member end of travel measurement.

The presence of a low permeability or amagnetic metal wall positioned between the moving member carrying the ferromagnetic targets and the transducer leads to the appearance of eddy currents in said wall. These eddy currents create losses which, at the measured signal, lead to a component in phase with the exciting current I. The output signal can then be written:

$$Um = Ua + j\, Ur$$

in which Ua is the in phase component and Ur the component in quadrature with the exciting current I, Um being the voltage induced at the terminals of the coil.

At the low frequencies for which the eddy currents in the wall have a negligible influence, the magnetic flux is virtually in phase with the exciting current, the output signals Um of the transducer then evolving in an identical manner to that of a conventional inductive transducer and increases directly with the exciting frequency. When the exciting frequency increases, the influence of the eddy currents increases.

Figure 7:
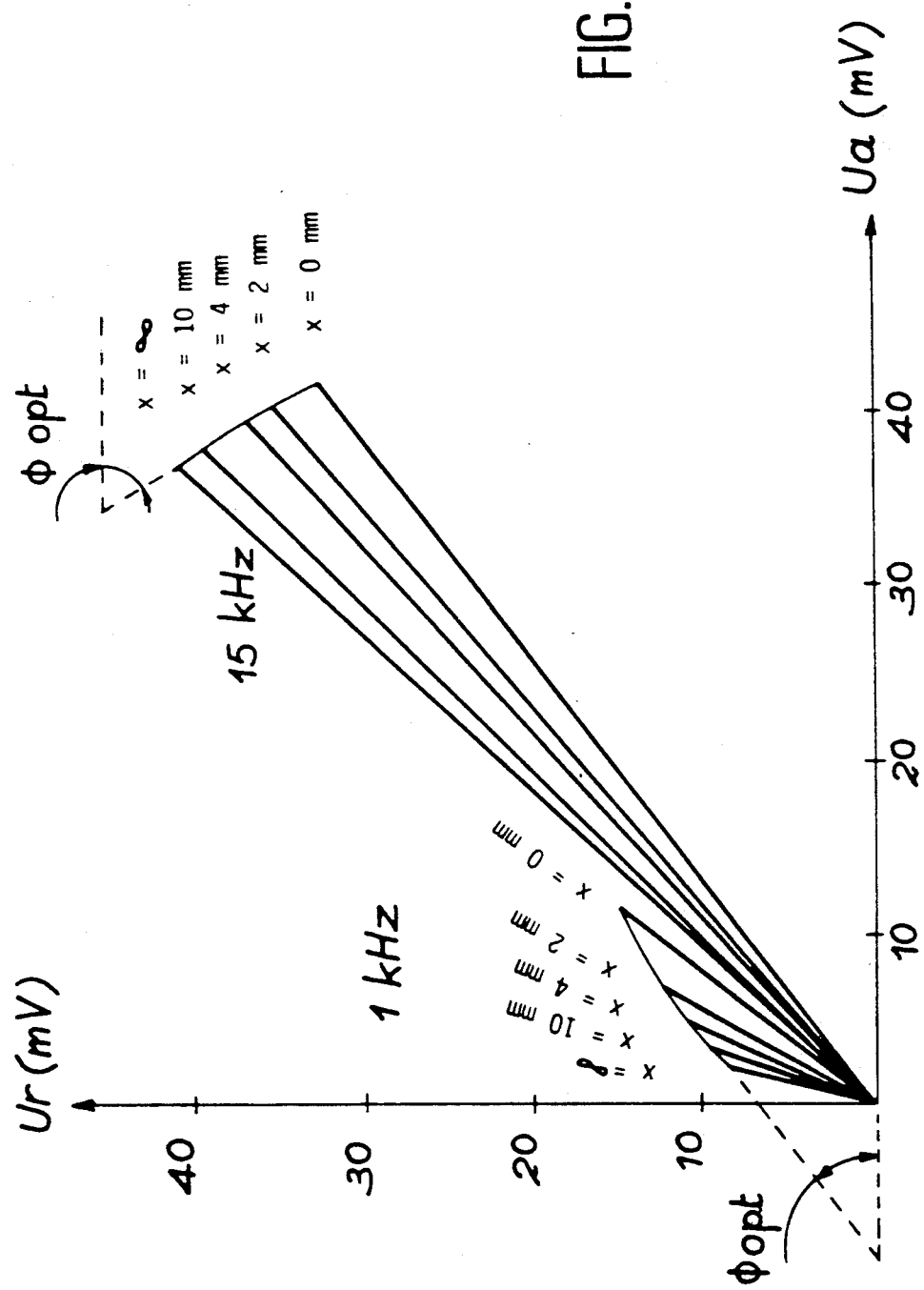

For example, FIG. 7 shows the Fresnel diagram of the vector Um representing the voltages supplied by a transducer in accordance with various target positions, for two different exciting frequencies. In this particular case, the curved portion on which evolves the end of the measured vector can easily be likened to a line forming an angle $\phi_{opt}$ with the abscissa axis.

The "signal treatment" part associated with said transducer can naturally exploit the value of the angle $\phi_{opt}$ by means of a synchronous detection in order to extract the useful term from the signals observed. This angle is dependent on the exciting frequency, the permeability, the resistivity and the thickness of the wall.

Thus, the moving member displacement measuring devices incorporate a referenced synchronous detection with respect to said angle by regulating the phase shifter. More specifically, the moving member displacement measuring devices are characterized in that the reference signal of the synchronous detection is phase-shifted with respect to the exciting current of the optimum angle $\phi$.

The invention is described in greater detail hereinafter relative to non-limitative embodiments and with reference to the attached drawings, wherein show:

FIG. 1 A diagram of the transducer according to the invention in a first embodiment.

Figure 2:
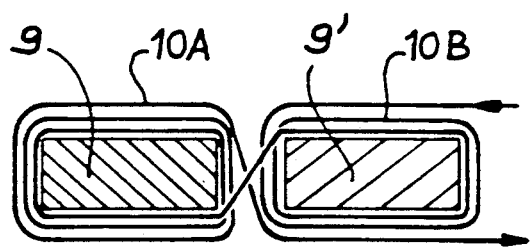

FIG. 2 A partial section of the two ferromagnetic cores showing the fitting of the measuring coil.

Figure 3:
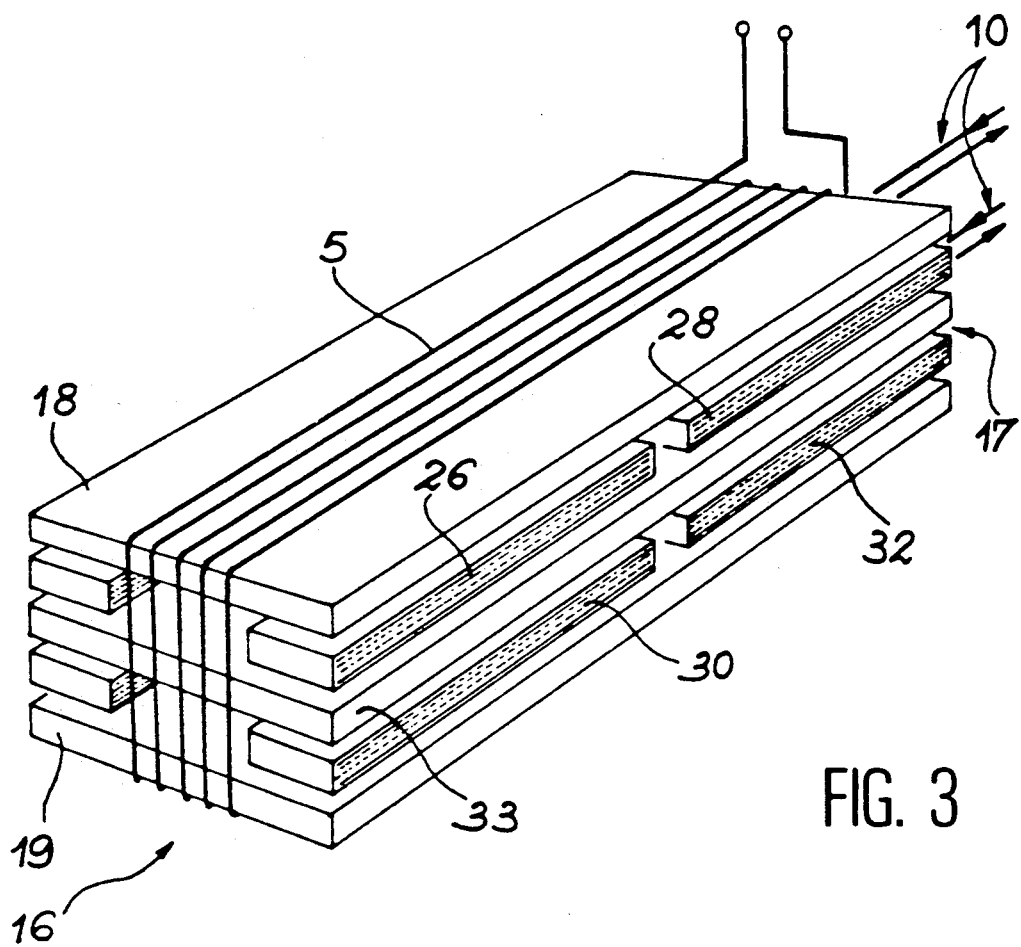

FIG. 3 A diagram relative to another embodiment of the transducer according to the invention.

Figure 4:
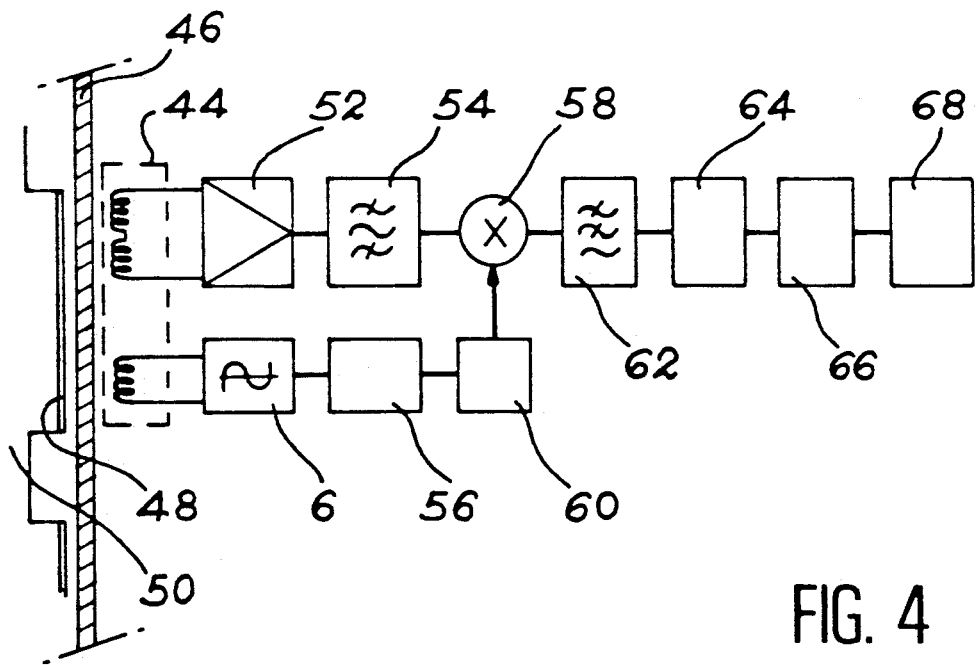

FIG. 4 A diagram of an example of the use of the transducer of FIG. 1 for producing a moving member displacement speed measuring device.

Figure 5:
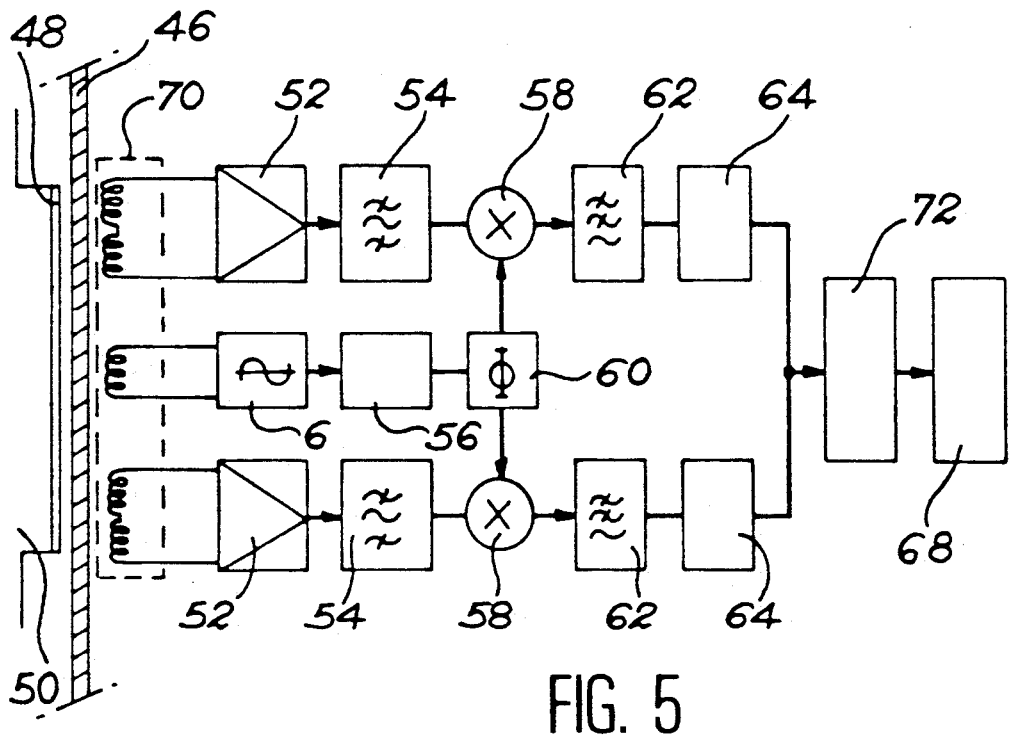

FIG. 5 A diagram of an example of using the transducer of FIG. 3 for producing a device for measuring the displacement of a moving member and for the determination of its displacement direction.

Figure 6:
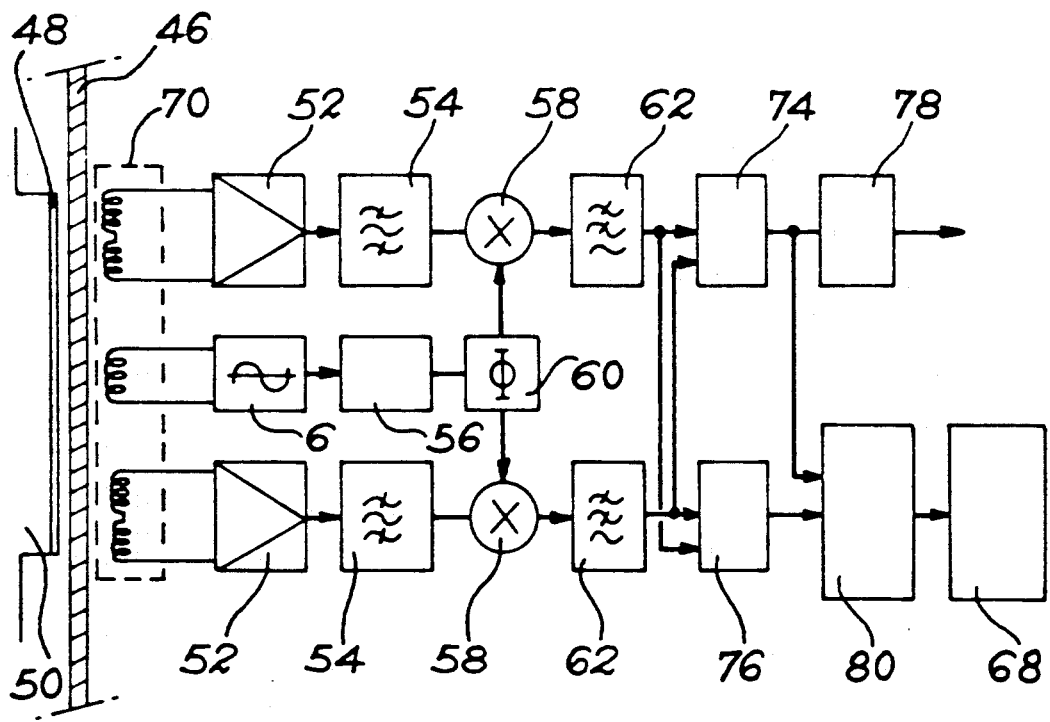

FIG. 6 A diagram of an example of the use of the transducer of FIG. 3 for producing an analog moving member displacement measuring device.

FIG. 7 The Fresnel diagram of the transducer for two exciting frequencies.

Figure 8:
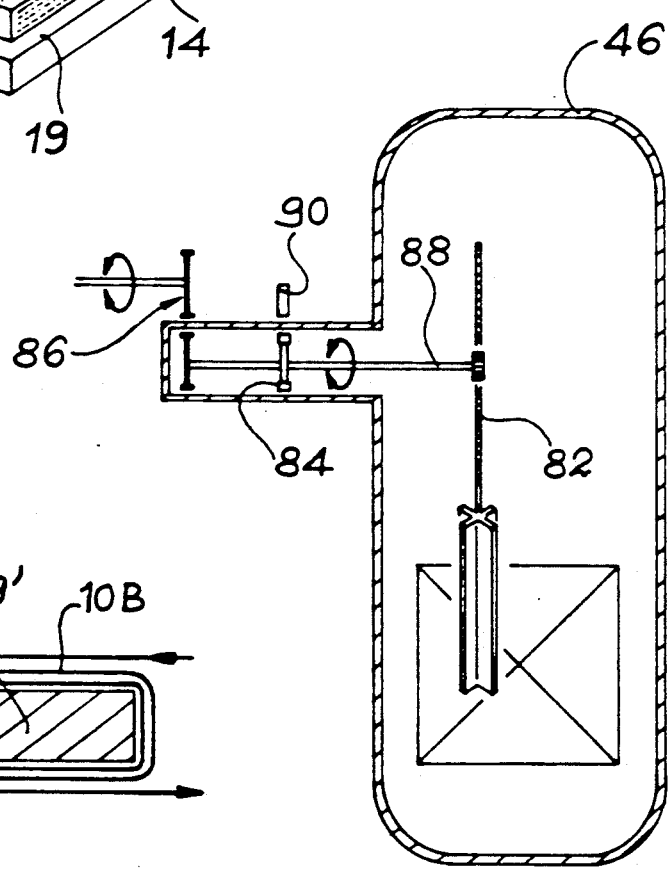

FIG. 8 A diagram relative to the installation according to the invention on a nuclear reactor vessel.

According to FIG. 1, the inductive transducer according to the invention is constituted by two U-shaped ferromagnetic cores 2, 8, positioned back to back in the same plane. The two branches 12 and 14 of the U-shaped ferromagnetic core 2 are oriented towards the transducer detection face 16.

A measuring coil 10 having N turns is respectively wound around the central parts 9 and 9' of the two ferromagnetic cores 2 and 8. Such a measuring coil 10 is shown in greater detail in FIG. 2, which shows in section the two central parts 9, 9' of the ferromagnetic cores 2 and 8, around which are respectively arranged N turns 10A and 10B wound in opposition, which makes it possible to overcome the interfering effects of physical influencing quantities, such as the surrounding magnetic field, the ambient temperature, etc.

The two terminals of said measuring coil 10 are connected to a device for measuring and processing the signal, which is not shown and which will be described hereinafter.

FIG. 1 also shows the other essential components of the inductive transducer. It is in particular possible to see two supporting and shielding plates 18, 19 made from a good electricity conducting, amagnetic material and which are enveloped by a not shown electrical insulator. These two plates 18 and 19 are positioned on either side of two ferromagnetic cores 2 and 8 in order to form a sandwich structure. Around these two plates 18 and 19 is wound the exciting coil 4 having M turns, namely three turns in FIG. 1. This exciting coil 4 is supplied by an alternating current source 6.

The moving member, whose position is to be detected, is provided with several elements, called targets, made from a ferromagnetic material, e.g. steel X13BC supplied by the Aubert and Duval Company. These targets can be constituted by ferromagnetic plates positioned along or around the moving member. Such targets can be detected by the transducer through a low permeability or amagnetic metal wall. The operating principle of the transducer according to the invention is as follows. The inductive transducer according to the invention is positioned in such a way that its detection face 16 constituted by the end of the two branches 12 and 14 of the ferromagnetic core 2 are positioned facing the moving member, the two branches 12 and 14 being perpendicular to the displacement direction thereof. When a target fixed to the moving member passes in the vicinity of the ends of the two branches 12 and 14, said member tends to close the magnetic circuit constituted by said first ferromagnetic core 2 surrounded by the exciting coil 4. However, the latter, when it is supplied with alternating current by the alternating current source 6, creates a magnetic field in the ferromagnetic cores 2 and 8.

Unlike the prior art transducer, the inductive transducer according to the invention operates with alternating current having a constant effective value. Therefore the number M of turns of the exciting coil 4 is constant, so that the product of the induction flux in the magnetic circuit by the reluctance thereof is also constant:

$$M \cdot I = R \cdot F$$

The targets fixed to the moving member modify the induction flux in the magnetic circuit, so that its reluctance is also modified. It is the variation of this reluctance which is measured by the voltage at the terminals of the measuring coil 10. The fact that the two parts 10A and 10B of the measuring coil 10 are mounted in opposition has the consequence of the interfering effects being cancelled out.

The construction of the two ferromagnetic cores 2 and 8 can be in the form of a superimposing of foils which have undergone surface passivation, which makes it possible to eliminate eddy currents. The support plates 18 and 19 are made from a good electricity conducting, amagnetic material, e.g. the aluminium A-U4G alloy. The support plates 18 and 19 are preferably enveloped by an electrical insulator.

With reference to FIG. 3, a second construction of the inductive transducer according to the invention provides for the use of two magnetic circuits with a view to simultaneously carrying out two measurements. Thus, as only a single measurement is performed, it is possible to detect the passages of the targets, count the same and therefore measure the displacement speed of the moving member. However, it is not possible to detect the displacement direction of the moving member by only using a single magnetic circuit. Consequently, in the case of FIG. 3, two simultaneous measurements are performed.

This second constructional variant relates to a two-stage inductive transducer, each of the stages being constituted by two ferromagnetic cores 26, 28 and 30, 32 respectively positioned back to back in the same plane. These two pairs of ferromagnetic cores 26, 28 and 30, 32 have in each case a measuring coil, as shown in FIG. 2. Such a transducer has two external support plates 18, 19 and an intermediate support plate 33, located between the two magnetic circuits respectively constituted by the two upper ferromagnetic cores 26, 28 and by the two lower ferromagnetic cores 30, 32. It is therefore the two output voltages of the two measuring coils 10 of these two magnetic circuits which are used for measuring the displacement of the moving member and the displacement direction. The measuring devices corresponding to said second variant of the transducer are described in greater detail hereinafter.

Once such inductive transducers have been constructed, they suffer from magnetic defects or magnetic asymmetries inherent in the manufacture or installation. In order to obviate these disadvantages, the inductive transducer according to the invention, as shown in FIG. 1, is equipped with a balancing core 34 constituted by two half-cylinders 36, 38, whereof one 36 is made from an amagnetic material and the other 38 from a ferromagnetic material. This balancing core 34 is placed close to the rear face of the transducer facing the two branches 20, 22 of the ferromagnetic core 8. It can be centered on the longitudinal axis 40 of the transducer and in such a way that its axis of revolution 42 is perpendicular to the axis 35 of the poles of the ferromagnetic core 8. It can also be positioned in such a way that its axis of revolution 42 is parallel to the axis 35 of the poles of the ferromagnetic core 8. The rotation of said balancing core 34 makes it possible to modify the reluctance of the magnetic circuit of the rear face 17 of the transducer. This therefore makes it possible to adjust the reproducibility of the performance characteristics between individual magnetic transducers. Thus, the transducers may be calibrated by adjusting the balancing core.

The measuring device shown in FIG. 4 makes it possible to measure the displacement speed of the moving member.

FIG. 4 shows said moving member 50 equipped with one of the targets 48 placed at regular intervals. The moving member 50 is separated from the detector 44 by the amagnetic metal wall 46, which isolates the moving member 50 from the transducer 44 with the two ferromagnetic cores. The terminals of the measuring coil of the transducer 44 are connected to a differential amplifier 52, at whose output is placed a first band-pass filter 54. The output of the exciting coil of the transducer 44 is connected to an alternating current source 6 frequency controlled by an oscillator 56. A multiplier 58 receives the output signals from the first band-pass filter 54 in order to multiply them by a reference signal. The signals are phase-shifted by an optimum angle φ with the aid of a phase shifter 60 connected to the oscillator 56.

In association with the second band-pass filter 62, the phase shifting operation makes it possible to extract the component of the signal having the maximum dynamics in the pass-band required by the application made of the transducer according to the invention.

The output of the second band-pass filter 62 is connected to the input of a pulse shaping circuit 64 having regulatable hyteresis and threshold. The latter makes it possible to generate pulses recorded by the counter 66 during a given time interval. Thus, at the output of the counter 66 there is a signal proportional to the displacement or rotation speed of the moving member 50. The measuring line can be completed by a display 68 for facilitating the exploitation of the result supplied by the counter 66. The measurement of the displacement of the moving member by pulse counting imposes the use of a two-stage inductive transducer.

With reference to FIG. 5 showing an installation intended for the measurement of the displacement and for the determination of the displacement direction of a moving member by pulse counting, the two-stage inductive transducer 70 is positioned facing the amagnetic wall 46 behind which moves the moving member 50 provided with regularly spaced ferromagnetic targets 48. The exciting coil of the transducer 70 is connected to an alternating current source 6 frequency controlled by an oscillator 56.

Such a device also comprises two measuring lines of signals supplied by the two-stage transducer 70. Each of these lines has a differential amplifier 52 connected to a first band-pass filter 54, whose output signals are multiplied by a reference signal with the aid of a multiplier 58, phase-shifted by an optimum angle φ with respect to the exciting current of the transducer, via a common phase shifter 60. The output signals of each of the multipliers 58 are respectively processed by a low-pass filter 62 and then, after passage into a shaping circuit with a regulatable threshold and hysteresis 64, the signals of the two measuring lines are recorded by a logic circuit 72 for counting the targets 48 and for determining the displacement direction of the moving member 50. The position and displacement direction can optionally be displayed on a display 68.

FIG. 6 shows a device according to the invention making it possible, with the aid of a two-stage transducer 70 positioned facing the targets 48, to carry out an analog measurement of the displacement of the moving member 50. The exciting coil of the transducer 70 is supplied with alternating current by a source 6 and frequency controlled by an oscillator 56.

The start of the two lines for measuring the signal supplied by the transducer 70 are identical to that of the device described hereinbefore and shown in FIG. 5.

However, at the output of the low-pass filters 62, the signals of the two measuring lines are subtracted from one another by subtraction means 74 and then optionally processed by a linearization circuit 78, which supplies a signal proportional to the displacement of the target.

This device also comprises addition means 76 and a logic circuit 80 for calculating the position and the displacement direction of the moving member 50 on the basis of signals supplied by the subtraction means 74 and the means 76. These informations can optionally be displayed on a display 68.

FIG. 7 illustrates in exemplified manner the diagram of the voltages Um supplied by an inductive transducer for two exciting frequencies, namely 1 KHz and 15 KHz and for different distances between the amagnetic wall and the target: $0 \text{ mm} \leq x \leq \infty$.

The end of the vector Um moves on a curve very close to a straight line forming an optimum angle φ with the abscissa axis.

With reference to FIG. 8, a preferred application of the inductive transducer according to the invention is the detection of the position and the displacement direction of the control rods 82 of a pressurized water nuclear reactor 86. These control rods 82 are brought into translation by means of a rack coupled to a rotating shaft 88 to which is fixed a toothed wheel 84. The teeth of the latter carry the ferromagnetic targets, said toothed wheel 84 being the moving member, whose rotation is measured with the aid of the transducer according to the invention. The nuclear reactor wall 46 is amagnetic. The inductive transducer 90 is then placed outside said wall 46 facing the toothed wheel 84. It is preferably placed in an amagnetic material protective case called a glove finger. The shaft 88 is rotated by an electromagnetic coupling 86 through the nuclear reactor wall 46. During the said movement the toothed wheel 84 is rotated. Therefore the ferromagnetic targets placed on its periphery move and the inductive transducer 90 detects this movement. It is therefore possible to evaluate the translation displacement of the control rods 82 placed within the nuclear reactor.

We claim:

1. Inductive transducer operating by the detection of the variation of the reluctance across a magnetic circuit, characterized in that it comprises two U-shaped ferromagnetic cores (2, 8), positioned back to back in the same plane and a measuring coil (10) having two windings positioned in opposition around the two ferromagnetic cores respectively, (2, 8) for measuring the reluctance of the magnetic circuit through the ferromagnetic cores; two amagnetic material support plates (18, 19) positioned above and below the two ferromagnetic cores (2, 8) for maintaining the latter in place; an exciting coil (4) supplied by a sinusoidal current which encompasses the cores and support plates; and a cylindrical balancing core (34) around an axis of revolution (42) constituted by two half-cylinders (36, 38), whereof one (36) is made from an amagnetic material and the other (38) from a ferromagnetic material, the balancing core (34) being placed close to the open end of one ferromagnetic core (8) and used to calibrate the transducer.

2. Transducer according to claim 1, characterized in that the two poles of the second ferromagnetic core (8) define an axis (35), so that the balancing core (34) has its axis of revolution (42) parallel to the axis (35) of the poles of the second ferromagnetic core (8).

3. Transducer according to claim 1, characterized in that the two poles of the second ferromagnetic core (8) define an axis (35), so that the balancing core (34) has its axis of revolution (42) perpendicular to the axis of the poles of the second ferromagnetic core (8).

4. Device according to claim 1 for measuring the displacement speed of a moving member (50) carrying a plurality of regularly spaced ferromagnetic targets (48), characterized in that it comprises a transducer according to claim 1, placed such that the open end of one ferromagnetic core (16) faces the moving member (50) and whose exciting coil (4) is connected to an alternating current source (6) frequency controlled by an oscillator (56) and a measuring line connected to the measuring coil (10) and having a differential amplifier (52), and a band-pass filter (54), whose output signals are multiplied by a reference signal by a multiplier (58) and phase-shifted by an optimum angle φ with respect to the exciting current of the transducer with the aid of a phase shifter (60), a second band-pass filter (62), a signal shaping circuit (64) and means for counting (66) and displaying (68) the thus obtained signals.

5. Transducer according to claim 1 incorporating two measuring stages according to claim 1, separated by an intermediate support plate (33), each measuring stage having two ferromagnetic cores (26, 28, 30, 32) according to claim 1 placed back to back in the same plane; two measuring coils according to claim 1 positioned in opposition around each of the two ferromagnetic cores respectively; and a single exciting coil (5) placed around the two exterior support plates (18, 19), as well as a single balancing core (34) placed close to the rear face of the transducers.

6. Device according to claim 5 for measuring the displacement of a moving member (50) by counting ferromagnetic targets (48) fixed to the moving member (50) and passing in front of the transducer, characterized in that it comprises a transducer according to claim 5, placed such that the open end of one ferromagnetic core (16) faces the moving member (50) and whose exciting coil (5) is connected to an alternating current source (6) frequency controlled by an oscillator (56) and two signal measuring lines are connected to each measuring coil respectively incorporating a differential amplifier (50), and a first band-pass filter (54), whose output signals are multipled by a reference signal with the aid of a multiplier (58) and phase-shifted by an optimum angle φ with respect to the exciting current of the transducer with the aid of a phase shifter (60), thus bringing about a synchronous detection, a second low-pass filter and a signal shaping circuit (64), the phase displacement of the signals between the two measuring lines being recorded by a logic circuit (72) for counting and determining the displacement direction of the moving member (50) and display means (68).

7. Device according to claim 5 for the analog measurement of the displacement of a moving member (50) carrying a ferromagnetic target (48), characterized in that it comprises a transducer according to claim 5 positioned such that the open end of one ferromagnetic core (16) faces the moving member (50) and whose exciting coil (5) is connected to an alternating current source (6) frequency controlled by an oscillator (56); two signal measuring lines one connected to each measuring coil respectively incorporating a differential amplifier (52), and a first band-pass filter (54), whose output signals are multiplied by a reference signal with the aid of a multiplier (58) and phase-shifted by an optimum angle φ with respect to the exciting current of the transducer with the aid of a phase shifter (60), thus carrying out a synchronous detection, a second low-pass filter (62), whereof the output signals of the two measuring lines are subtracted from one another by a common subtraction circuit (74).

8. Device according to claim 7, characterized in that the output of the subtraction means (74) is connected to a linearization circuit (78).

9. Device according to claims 7 or 8, characterized in that it comprises addition means (76) receiving the output of the two second low-pass filters (62) and being connected to a logic circuit (80) for calculating the position and the displacement direction of the moving member (50) also receiving the signal supplied by the subtraction means (74).

* * * * *